United States Patent [19]
Kim et al.

[11] Patent Number: 6,100,953
[45] Date of Patent: Aug. 8, 2000

[54] MULTI-DOMAIN LIQUID CRYSTAL DISPLAY DEVICE WITH CONCAVE PORTION IN COLOR FILTER AND METHOD OF MANUFACTURING THEREOF

[75] Inventors: Kyeong Jin Kim, Bucheon-shi; Yun Bok Lee, Kumpo-shi, both of Rep. of Korea

[73] Assignee: LG. Philips LCD Co., Ltd., Seoul, Rep. of Korea

[21] Appl. No.: 09/377,897

[22] Filed: Aug. 20, 1999

[30] Foreign Application Priority Data

Aug. 20, 1998 [KR] Rep. of Korea ................. 98-33812
Dec. 18, 1998 [KR] Rep. of Korea ................. 98-56136

[51] Int. Cl.$^7$ .................. G02F 1/1337; G02F 1/1333
[52] U.S. Cl. ................................. 349/129; 349/122
[58] Field of Search .......................... 349/129, 122

[56] References Cited

U.S. PATENT DOCUMENTS

| | | | |
|---|---|---|---|
| 3,914,022 | 10/1975 | Kashnow | 350/160 |
| 4,701,028 | 10/1987 | Clerc et al. | 350/337 |
| 4,786,147 | 11/1988 | Clerc et al. | 350/347 |
| 4,889,412 | 12/1989 | Clerc et al. | 359/75 |
| 5,039,185 | 8/1991 | Uchida et al. | 359/90 |
| 5,093,741 | 3/1992 | Shohara et al. | 359/93 |
| 5,182,664 | 1/1993 | Clerc | 359/90 |
| 5,229,873 | 7/1993 | Hirose et al. | 359/55 |

(List continued on next page.)

FOREIGN PATENT DOCUMENTS

| | | |
|---|---|---|
| 2-294622 | 12/1990 | Japan . |
| 3-261914 | 11/1991 | Japan . |
| 4-67127 | 3/1992 | Japan . |
| 4-261522 | 9/1992 | Japan . |
| 5-2161 | 1/1993 | Japan . |
| 6-194656 | 7/1994 | Japan . |
| 6-194657 | 7/1994 | Japan . |
| 6-258649 | 9/1994 | Japan . |
| 6-273798 | 9/1994 | Japan . |
| 6-281959 | 10/1994 | Japan . |
| 6-347824 | 12/1994 | Japan . |
| 7-13164 | 1/1995 | Japan . |
| 7-13166 | 1/1995 | Japan . |
| 7-28063 | 1/1995 | Japan . |
| 7-36044 | 2/1995 | Japan . |
| 7-43698 | 2/1995 | Japan . |
| 7-43719 | 2/1995 | Japan . |
| 7-64089 | 3/1995 | Japan . |
| 7-181493 | 7/1995 | Japan . |
| 7-199190 | 8/1995 | Japan . |
| 7-311383 | 11/1995 | Japan . |
| 8-22023 | 1/1996 | Japan . |
| 8-76125 | 3/1996 | Japan . |
| 8-101399 | 4/1996 | Japan . |
| 8-146468 | 6/1996 | Japan . |
| 8-220511 | 8/1996 | Japan . |
| 8-220524 | 8/1996 | Japan . |
| 8-313915 | 11/1996 | Japan . |
| 9-22025 | 1/1997 | Japan . |
| 9-152583 | 6/1997 | Japan . |
| 9-230360 | 9/1997 | Japan . |
| 9-325373 | 12/1997 | Japan . |

*Primary Examiner*—Kenneth Parker
*Assistant Examiner*—Mike Qi
*Attorney, Agent, or Firm*—Long Aldridge & Norman LLP

[57] ABSTRACT

The present multi-domain liquid crystal display device includes first and second substrates facing each other, a liquid crystal layer between the first and second substrates, a plurality of gate bus lines arranged in a first direction on the first substrate and a plurality of data bus lines arranged in a second direction on the first substrate to define a pixel region, a thin film transistor positioned at a crossing area of the data bus line and the gate bus line and comprising a gate electrode, a semiconductor layer, and source/drain electrodes, a pixel electrode in the pixel region, a light shielding layer on the second substrate, a color filter layer having electric field-distorting recesses on its surface on the light shielding layer, a common electrode having recesses corresponding to the electric field-distorting recesses of the color filter layer, and an alignment layer on at least one substrate between the first and second substrates.

44 Claims, 17 Drawing Sheets

U.S. PATENT DOCUMENTS

| | | | |
|---|---|---|---|
| 5,309,264 | 5/1994 | Lien et al. | 359/87 |
| 5,339,181 | 8/1994 | Kim et al. | 359/59 |
| 5,477,358 | 12/1995 | Rosenblatt et al. | 357/77 |
| 5,517,341 | 5/1996 | Kim et al. | 359/59 |
| 5,517,342 | 5/1996 | Kim et al. | 359/59 |
| 5,602,662 | 2/1997 | Rosenblatt et al. | 349/130 |
| 5,608,556 | 3/1997 | Koma | 349/143 |
| 5,621,558 | 4/1997 | Shimada et al. | 349/130 |
| 5,666,179 | 9/1997 | Koma | 349/143 |
| 5,673,092 | 9/1997 | Horie et al. | 349/86 |
| 5,686,977 | 11/1997 | Kim et al. | 349/38 |
| 5,767,926 | 6/1998 | Kim et al. | 349/38 |
| 5,777,711 | 7/1998 | Sugiyama | 349/143 |
| 5,856,857 | 9/1999 | Kim | 349/129 |
| 5,909,265 | 6/1999 | Kim et al. | 349/129 |

MULTI-DOMAIN LIQUID CRYSTAL DISPLAY DEVICE WITH CONCAVE PORTION IN COLOR FILTER AND METHOD OF MANUFACTURING THEREOF

This application claims the benefit of Korean Patent Application No. 1998-33812, filed on Aug. 20, 1998 and Korean Patent Application No. 1998-56136, filed on Dec. 18, 1998.

BACKGROUND OF THE INVENTION

1. Field of the Invention

The present invention relates to a liquid crystal display device (LCD), and more particularly, to a multi-domain liquid crystal display device having color filter layer with electric field-distorting holes and a subsidiary electrode on an lower substrate to distort electric field and method of manufacturing thereof.

2. Description of the Related Art

Recently, an LCD has been proposed where the liquid crystal is not aligned, and the liquid crystals are driven by side electrodes insulated from pixel electrodes. FIGS. 1A and 1B are sectional views of a pixel unit of conventional LCDs.

In the conventional LCD, a plurality of gate bus lines arranged in a first direction on a first substrate and a plurality of data bus lines arranged in a second direction on the first substrate divide the first substrate into a plurality of pixel regions. A thin film transistor (TFT) applies an image signal delivered from the data bus line to a pixel electrode 13 on a passivation layer. The TFT is formed on each pixel region and comprises a gate electrode, a gate insulator, a semiconductor layer, a source electrode, a drain electrode, etc.

The passivation layer is preferably formed over the whole first substrate. The pixel electrode 13 is coupled to the drain electrode on the passivation layer. Side electrode 15 is formed in a region except a region where pixel electrode 13 is formed on the passivation layer.

On the second substrate, a light shielding layer 25 is formed shielding light leakage from the gate bus line, data bus line, and TFT. A color filter layer 23 is on light shielding layer 25. A common electrode 17 is on color filter layer 23. A liquid crystal layer is between the first and second substrates.

A side electrode 15 and an open area 27 of the common electrode 17 distort the electric field applied to the liquid crystal layer. Then, in a unit pixel, liquid crystal molecules are variously driven. This means that when voltage is applied to the LCD, dielectric energy due to the distorted electric field arranges the liquid crystal directors in a needed or desired position.

However, to obtain a multi-domain effect, open area 27 in common electrode 17 is necessary, which requires patterning of the common electrode 17. Moreover, if the electrodes do not have an open area or the width thereof is narrow, the distortion of electric field needed to divide the pixel region becomes weak. Then, when voltage over a threshold voltage, $V_{th}$, is applied, the time needed for the liquid crystal directors to become stable increases.

SUMMARY OF THE INVENTION

Accordingly, the present invention is directed to a liquid crystal display device that substantially obviates one or more problems due to limitations and disadvantages of the related art.

An object of the present invention is to provide a LCD having a color filter layer with electric field-distorting holes and a method for manufacturing thereof.

Another object of the present invention is to simplify the process of manufacturing an LCD having a color filter layer with electric field-distorting recesses A further object of the present invention is to provide an LCD having a wide viewing angle resulting from a multi-domain effect.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other; a liquid crystal layer between the first and second substrates; a plurality of gate bus lines arranged in a first direction on the first substrate and a plurality of data bus lines arranged in a second direction on the first substrate to define a pixel region; a thin film transistor positioned at a crossing area of the data bus line and the gate bus line and comprising a gate electrode, a semiconductor layer, and source/drain electrodes; a pixel electrode in the pixel region; a light shielding layer on the second substrate; a color filter layer on the light shielding layer and having first plurality of recesses; a common electrode on the color filter layer and having second plurality of recesses corresponding to the first plurality of recesses of the color filter layer; and an alignment layer on at least one substrate.

In another aspect of the present invention, a method of manufacturing a multi-domain liquid crystal display device comprises the steps of forming a plurality of light shielding layers on a substrate; forming a color filter layer with a plurality of electric field-distorting recesses on the light shielding layer; and forming a common electrode on the color filter layer, the common electrode having recesses corresponding to the electric field-distorting recesses of the color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings.

DETAILED DESCRIPTION OF THE INVENTION

The multi-domain liquid crystal display of the present invention comprises first and second substrates facing each other, a liquid crystal layer between the first and second substrates, a plurality of gate bus lines arranged in a first direction on the first substrate and a plurality of data bus lines arranged in a second direction on the first substrate to define a pixel region, a thin film transistor positioned at a crossing area of the data bus line and the gate bus line and comprising a gate electrode, a semiconductor layer, and source/drain electrodes, a pixel electrode in the pixel region, a light shielding layer on the second substrate, a color filter layer having electric field-distorting holes on its surface on the light shielding layer, a common electrode as a body along with surface of the color filter layer, and an alignment layer on at least one substrate between the first and second substrates.

The multi-domain liquid crystal display device further comprises a subsidiary electrode on the same layer as the pixel electrode. The subsidiary or side electrode is in a region except a region where the pixel electrode is formed, and is electrically connected to the common electrode. Thus, the subsidiary electrode preferably does not overlap with the pixel electrode.

The present method for manufacturing a multi-domain liquid crystal display device comprises the steps of forming a plurality of light shielding layers on a substrate, forming a color filter layer with a plurality of electric field-distorting holes on the light shielding layer, and forming a common electrode as a body along with surface of the color filter layer.

The step of forming a color filter layer is accomplished by dyeing or dispersing a dye material or a pigment. The step of forming a color filter layer comprises the steps of, depositing a photosensitive layer, irradiating light to the photosensitive layer using a mask having a slit, and developing the photosensitive layer.

Hereinafter, the multi-domain liquid crystal display device and method for manufacturing the LCD of the present invention is explained in detail by accompanying the drawings.

FIGS. 2A, 2B and 3A, 3B are sectional views of the multi-domain liquid crystal display devices according to the first and second embodiments.

Figure 5A:
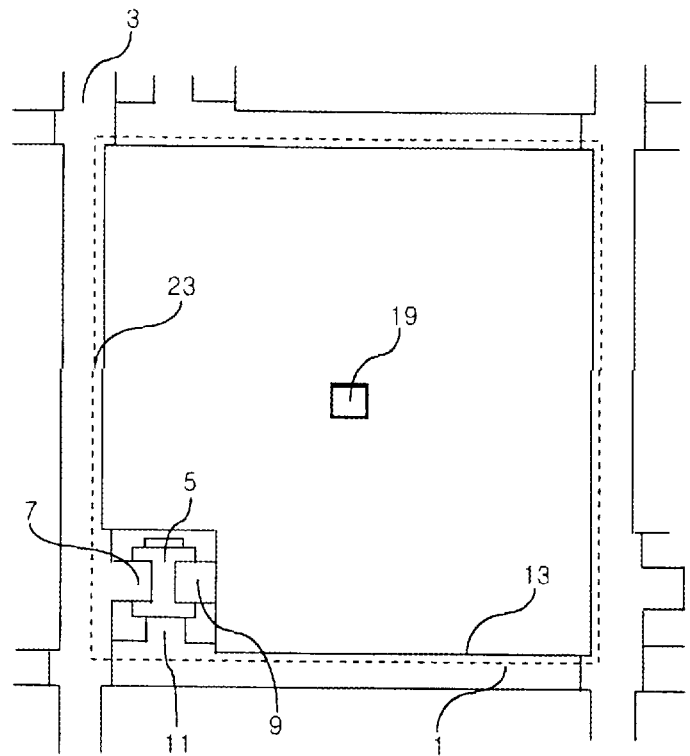
FIGS. 5A to 5D are views showing various electric field distorting holes according to embodiments of the present invention.
Figure 5B:
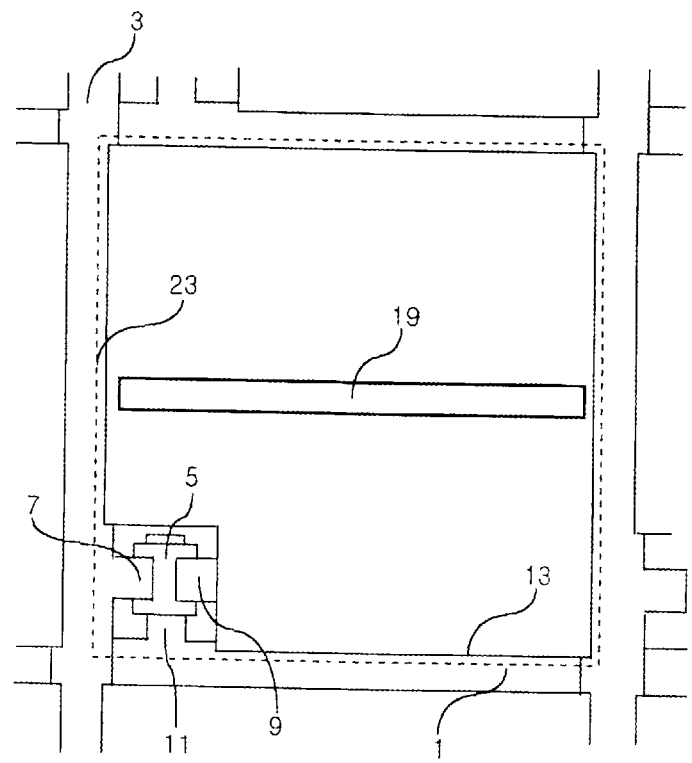
Figure 5C:
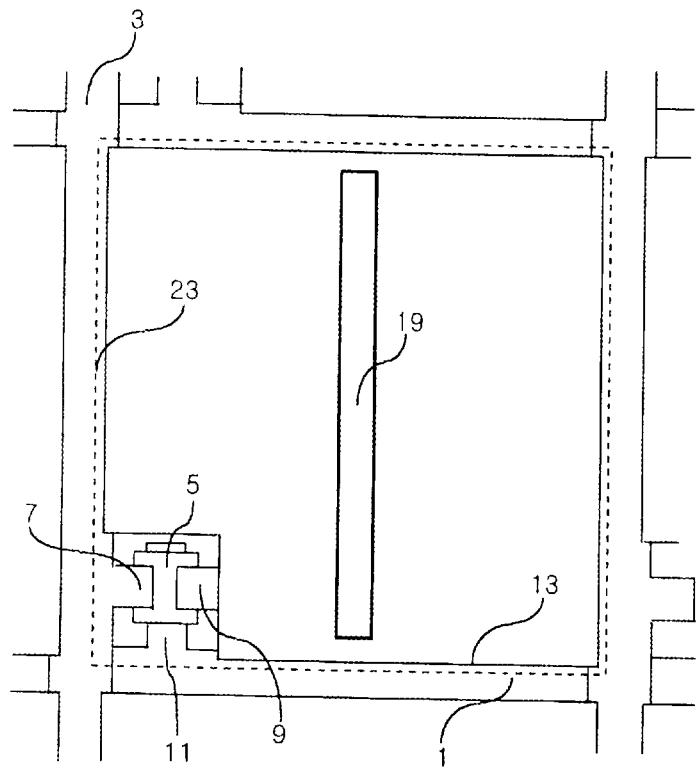
Figure 5D:
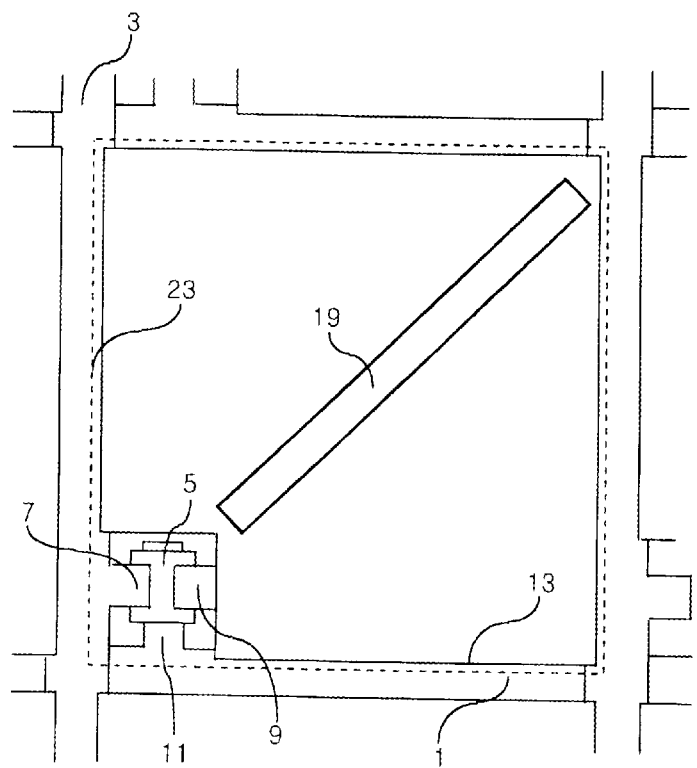

Referring to FIGS. 2A, 2B and 3A, 3B and as shown in FIG. 5A, for example, the present invention comprises first and second substrates, a plurality of gate bus lines 1 arranged in a first direction on the first substrate and a plurality of data bus lines 3 arranged in a second direction on the first substrate, a TFT, a passivation layer, and a pixel electrode.

Data bus lines 3 and gate bus lines 1 divide the first substrate into a plurality of pixel regions. The TFT is formed on the each pixel region and comprises a gate electrode 11, a gate insulator, a semiconductor layer 5, an ohmic contact layer, and source/drain electrodes 7, 9. The passivation layer is preferably formed through the whole first substrate. A pixel electrode 13 is coupled to drain electrode 9 and overlaps the TFT and/or data bus lines 3, and gate bus lines 1 on the passivation layer.

Also, the present invention comprises a light shielding layer 25 which shields light leakage from gate bus line 1, data bus line 3, and TFT. A color filter layer 23 on light shielding layer 25. A common electrode 17 with electric field-distorting holes or recesses 19 is on color filter layer 23. A liquid crystal layer is between the first and second substrates. Although FIGS. 2 and 3 show recesses 19, the recesses 19 may be replaced by a hole in the color filter to expose the substrate.

Figure 3A:
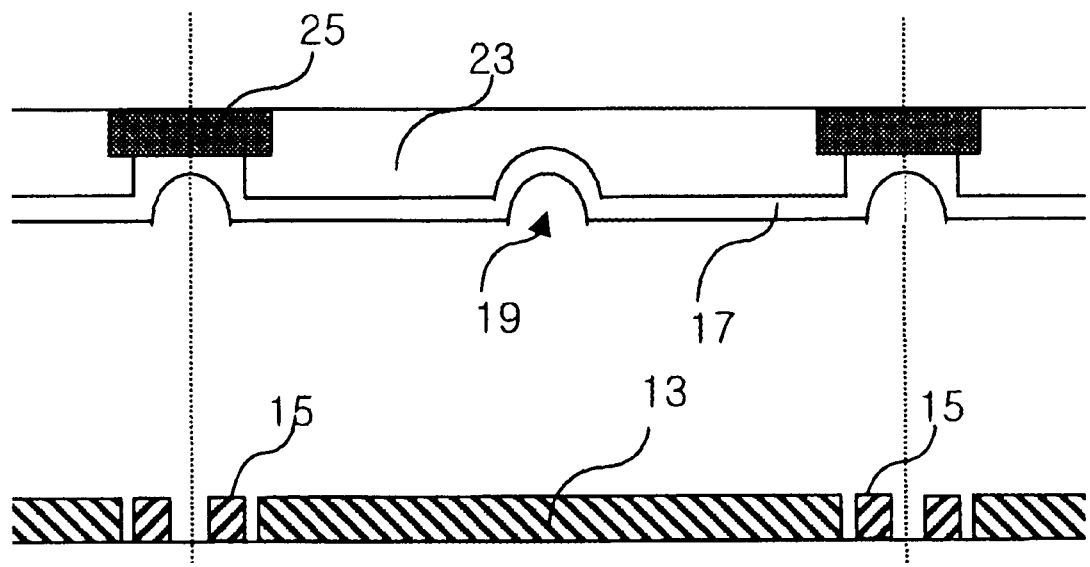
FIGS. 3A and 3B are sectional views of the multi-domain liquid crystal display device according to a second embodiment of the present invention.
Figure 3B:
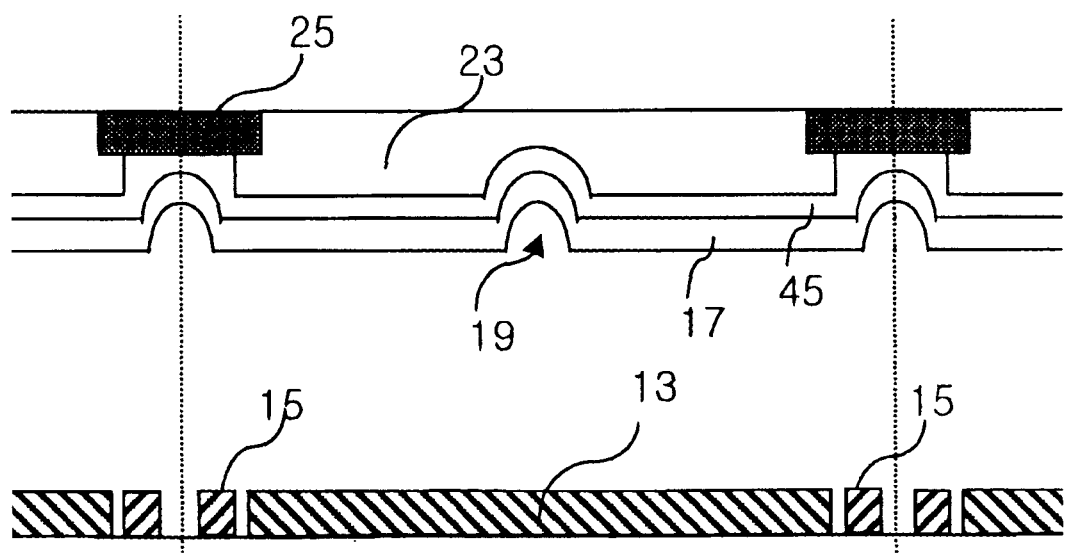
Figure 4A:
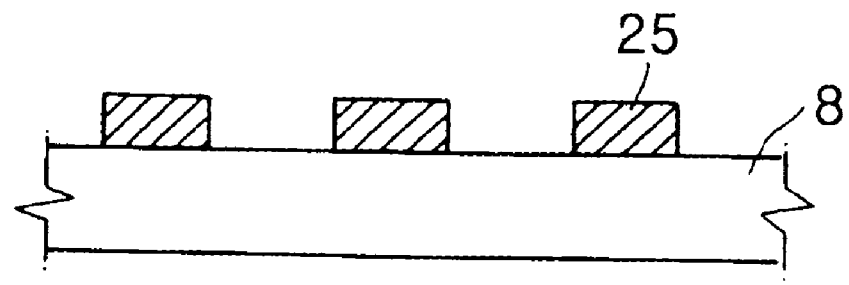
FIGS. 4A to 4F are views showing the formation of a color filter layer according to the present invention.
Figure 4B:
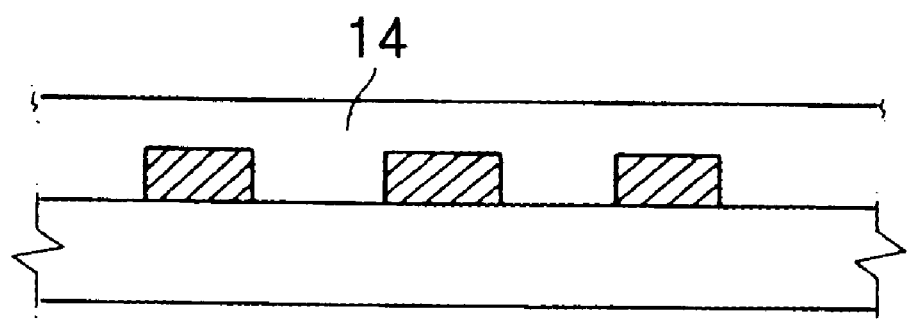
Figure 4C:
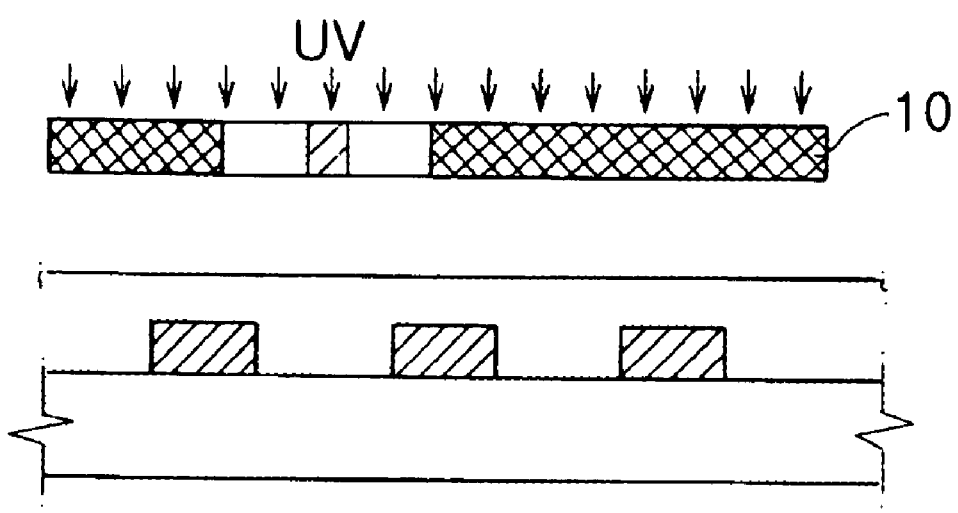
Figure 4D:
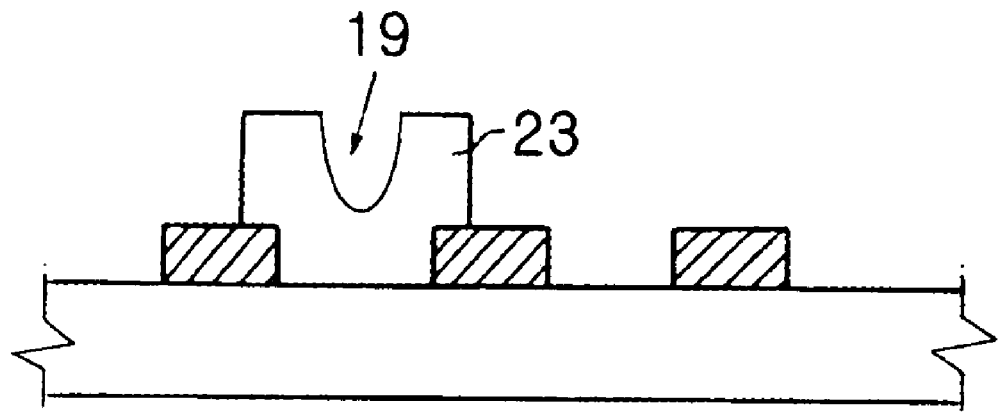
Figure 4E:
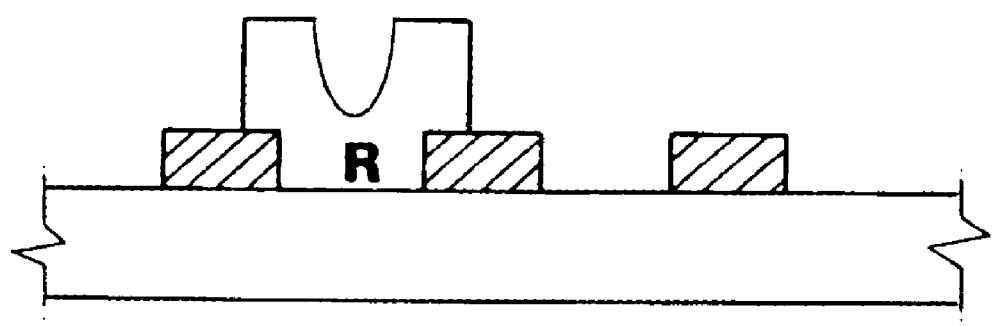
Figure 4F:
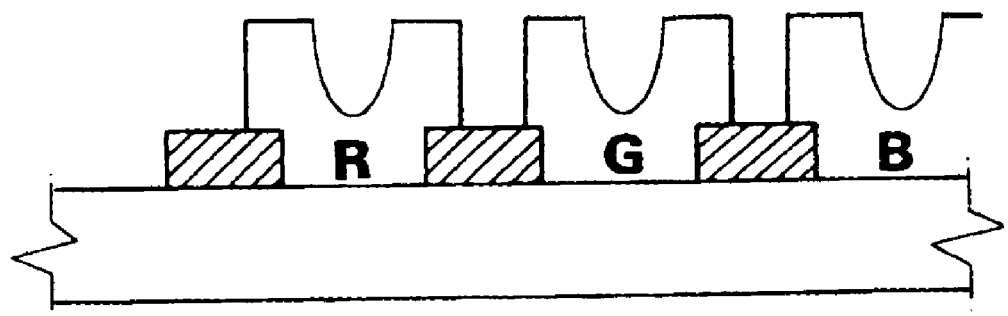

As a modification, the second embodiment of shown in FIGS. 3A and 3B further comprises a subsidiary electrode 15 on the passivation layer in a region except a region where the pixel electrode is not formed.

Figure 7A:
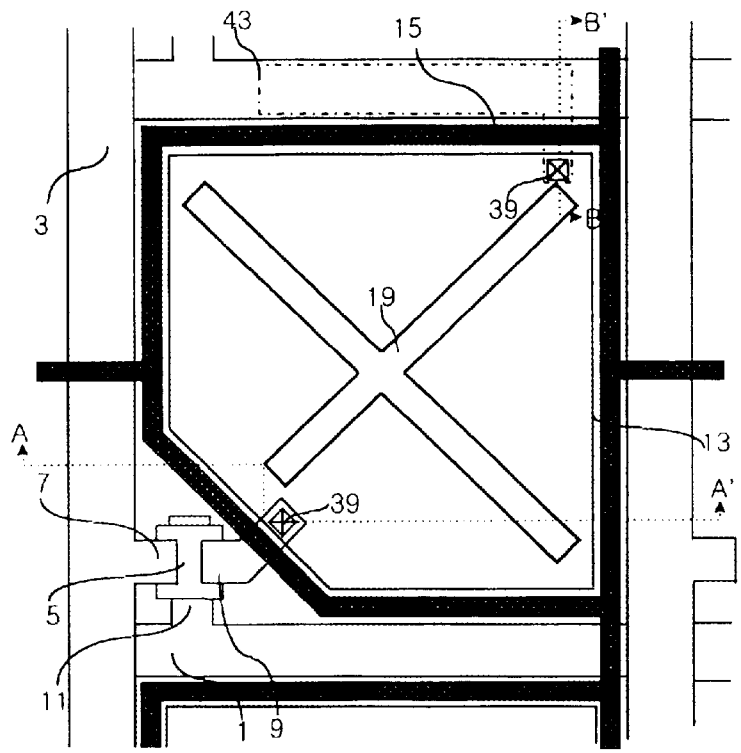
FIGS. 7A to 7E are plan views of the multi-domain liquid crystal display devices according to embodiments of the present invention.
Figure 10A:
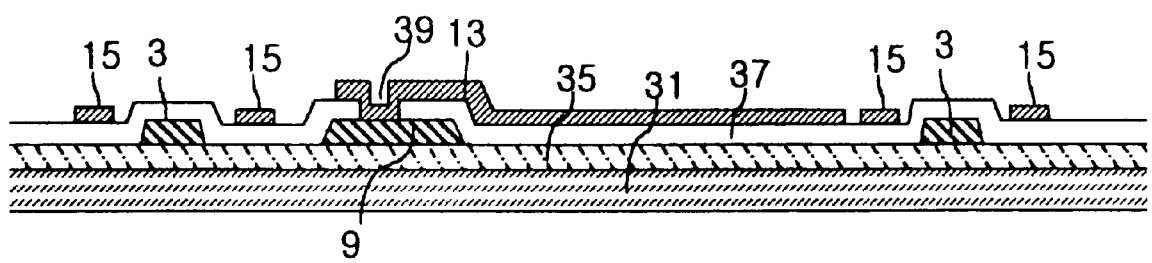
FIGS. 10A and 10B are sectional views taken along the lines A–A' and B–B' of FIG. 7A.
Figure 10B:
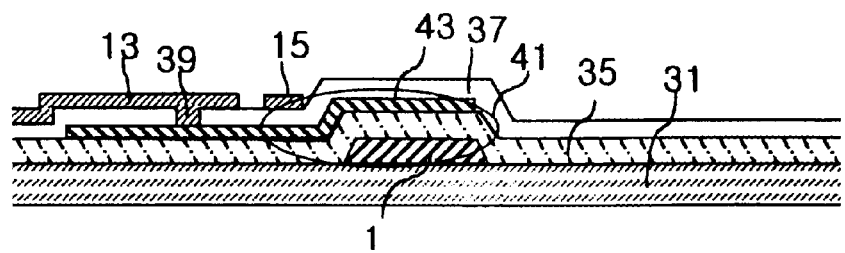

FIGS. 9A to 9F are sectional views showing the manufacturing process of the multi-domain liquid crystal display device according to the present invention, and FIGS. 10A and 10B are sectional views taken along the lines A–A' and B–B' of FIG. 7A.

To manufacture the LCD, in each pixel region on the first substrate, a TFT is formed comprising gate electrode 11, gate insulator 35, semiconductor layer 5, ohmic contact layer 6 and source/drain electrodes 7, 9. At this time, a plurality of gate bus lines 1 and a plurality of data bus lines 3 are formed to divide the first substrate into a plurality of pixel regions.

Gate electrode 11 and gate bus line 1 are formed by sputtering and patterning a metal such as Al, Mo, Cr, Ta, or Al alloy, etc. The gate insulator 35 is formed by depositing $SiN_x$ or $SiO_x$ using PECVD thereon.

The semiconductor layer 5 and the ohmic contact layer 6 are formed by depositing with PECVD (Plasma Enhanced Chemical Vapor Deposition), and patterning amorphous silicon (a—Si) and doped amorphous silicon ($n^+$ a—Si), respectively. Also, gate insulator 35, amorphous silicon (a—Si), and doped amorphous silicon ($n^+$ a—Si) are formed by PECVD and patterned.

Data bus line 3 and source/drain electrodes 7, 9 are formed by sputtering and patterning a metal such as Al, Mo, Cr, Ta, or Al alloy, etc. At this time, A storage electrode 43 is additionally formed in the pixel region on the gate bus line 1 at the same time, the storage electrode 43 makes a storage capacitor with gate bus line 1.

Subsequently, passivation layer 37 is formed with BCB (BenzoCycloButene), acrylic resin, polyimide based material, $SiN_x$ or $SiO_x$ on the whole first substrate 31. Pixel electrode 13 is formed by sputtering and patterning a metal such as ITO (indium tin oxide). A contact hole 39 is formed to connect the pixel electrode 13 to the drain and storage electrodes 9, 43 by opening and patterning a part of the passivation layer 37 on the drain electrode and storage electrode.

Pixel electrode 13 is formed by depositing using a sputtering and patterning technique a metal such as ITO (indium tin oxide), Al or Cr. It is also possible to form pixel electrode 13 by patterning the same metal once or by patterning different metals twice.

In the case of forming subsidiary electrode 15, when pixel electrode 13 is formed, subsidiary electrode 15 is preferably patterned at the same time.

When the subsidiary electrode 15 and pixel electrode 13 are formed with the same material, the subsidiary and pixel electrodes are simultaneously formed with one mask and the subsidiary electrode is connected electrically to common electrode 17. Alternately, it is possible to form them with different materials or double layer with additional masks.

To apply a voltage (e.g., $V_{com}$) to subsidiary electrode 15, an Ag-dotting part is formed at each corner of the driving area on first substrate 31, electric field is applied to second substrate 33, and the liquid crystal molecules are driven by the potential difference. A voltage ($V_{com}$) is applied to subsidiary electrode 15 by connecting the Ag-dotting part to the subsidiary electrode, which is preferably accomplished simultaneously when forming the subsidiary electrode.

In the second substrate, color filter layer 23 is formed as R, G, B (Red, Green, Blue) elements which are repeated for each pixel. In general, to fabricate a color filter layer, a dyeing method or a dispersing method is used, which is divided into a method for dyeing or dispersing a dyestuff or dye material, and a method for dispersing a pigment.

The dyeing method for dye material comprises exposing and developing dyeable and photosensitive resin on a transparent substrate, and dyeing the resin with a dyeing solution. The dispersing method for dye material comprises etching a polyimide layer dispersed with dyestuff using a photoresist. The dispersing method for pigment comprises depositing a photosensitive material dispersed with pigment on a photosensitive resin, then exposing, and developing. Alternatively, the dispersing method for pigment comprises etching a non-photosensitive material dispersed with pigment on polyimide with a photoresist.

FIGS. 4A to 4F are views showing the formation of a color filter layer according to the present invention. A light shielding layer 25 is formed on a substrate 8 (refer to FIG. 4A), a dyeable photosensitive layer 14 is deposited thereon (refer to FIG. 4B), and a front exposure is performed with a mask 10 (refer to FIG. 4C). The mask has various shapes of slits which allows electric field-distorting portions such as holes or recesses to be patterned at the same time. That is, color filter layer 23 is patterned to have electric field-distorting holes 19 (refer to FIG. 4D), and dyed with a suitable dye material (R, G, B)(refer to FIG. 4E). This process shown in FIGS. 4B to 4E is repeated to form the color filter elements (R, G, B) on the substrate (refer to FIG. 4F).

Common electrode 17 is formed following the contours of color filter layer 23 including the recesses or holes 19 by depositing ITO preferably using a sputtering and patterning technique on color filter layer 23. Accordingly, the common electrode 17 also includes recesses corresponding to the recesses of the color filter layer. The liquid crystal layer is formed by injecting liquid crystal between the first and second substrates.

The liquid crystal layer may include liquid crystal molecules having positive or negative dielectric anisotropy. Also, the liquid crystal layer may include chiral dopants.

The common electrode 17 is formed along the surface of color filter layer 23, and due to the electric field-distorting recesses or holes 19 of color filter layer 23, a multi-domain effect is produced. That is, a response characteristic is improved by forming color filter layer 23 to be about 1.0~2.0 micrometers in thickness. The electric field distorting effect is increased by the electric field-distorting recesses or holes 19, which stably align the liquid crystal molecules. Accordingly, the multi-domain effect is enhanced.

On at least one substrate, a compensation film 29 is formed with polymer. The compensation film is preferably a negative uniaxial film, which has one optical axis, and compensates the phase difference of the direction according to viewing-angle. Hence, it is possible to compensate effectively the right-left viewing angle by widening the area without gray inversion, increasing contrast ratio in an inclined direction, and forming a multi-domain pixel.

In the present multi-domain liquid crystal display device, the compensation film may be formed by a negative biaxial film with two optical axes and wider viewing angle characteristics as compared with the negative uniaxial film. The compensation film may be formed on both substrates or on one of them.

After forming the compensation film, a polarizer is formed on at least one substrate. At this time, the polarization axis of the polarizer is 45°, 135° against the alignment axis of the liquid crystal molecules, and the compensation film and polarizer are preferably made as one.

Figure 6A:
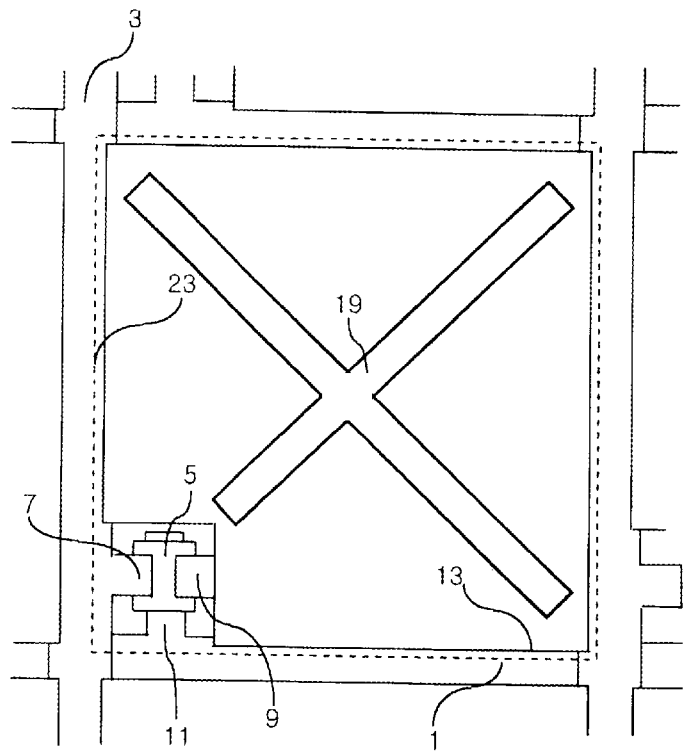
FIGS. 6A to 6C are views showing various electric field distorting holes according to embodiments of the present invention.
Figure 6B:
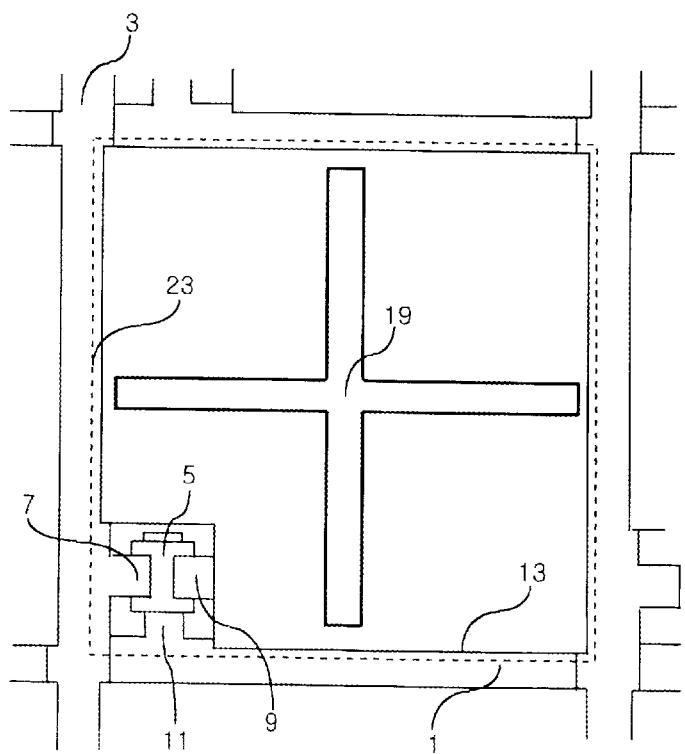
Figure 6C:
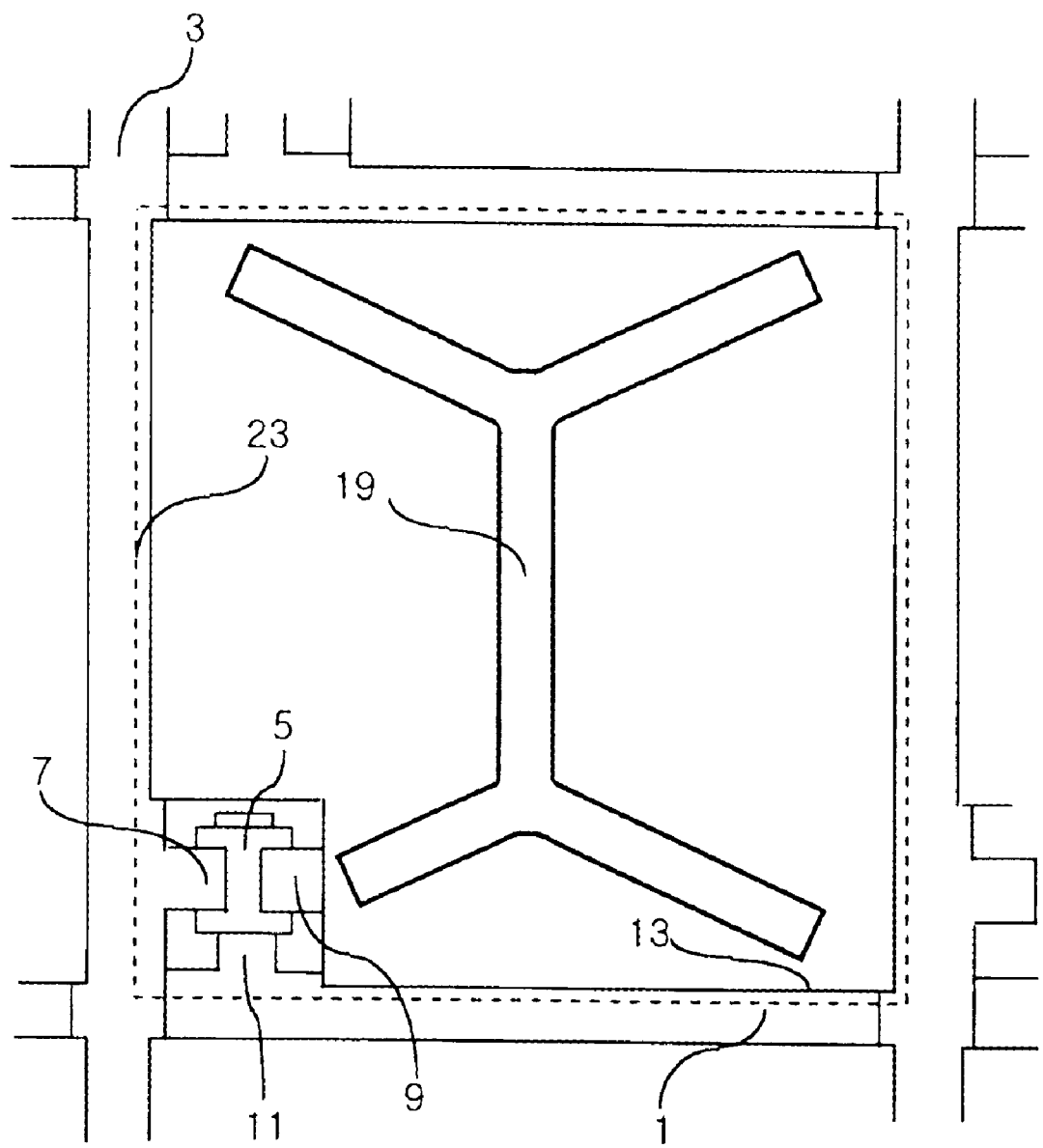

Two domains are obtained by patterning electric field-distorting holes 19 horizontally, vertically, and/or diagonally, as shown in FIGS. 5A to 5D, or as shown in FIGS. 6A to 6C. A multi-domain may be obtained by patterning electric field-distorting holes 19 to four domains using "+", "x", or double "Y" shapes.

FIGS. 7A to 7E and FIGS. 8A to 8D are plan views of the multi-domain liquid crystal display device according to different embodiments of the present invention.

In the LCD of FIGS. 7A to 7E, subsidiary electrode 15 and pixel electrode 13 are separated by a passivation layer as an intermediate, which prevents gate bus line 1 and data bus line 3 from interfering with the distorted electric field of subsidiary electrode 15.

The passivation layer 37 includes a material such as $SiN_x$ or $SiO_x$. Moreover, if subsidiary electrode 15 and pixel electrode 13 overlap the TFT and/or data bus line 3, crosstalk is generated. Therefore, subsidiary electrode 15 and pixel electrode 13 are preferably formed to not overlap using the passivation layer 37 as an intermediate or buffer.

Figure 7B:
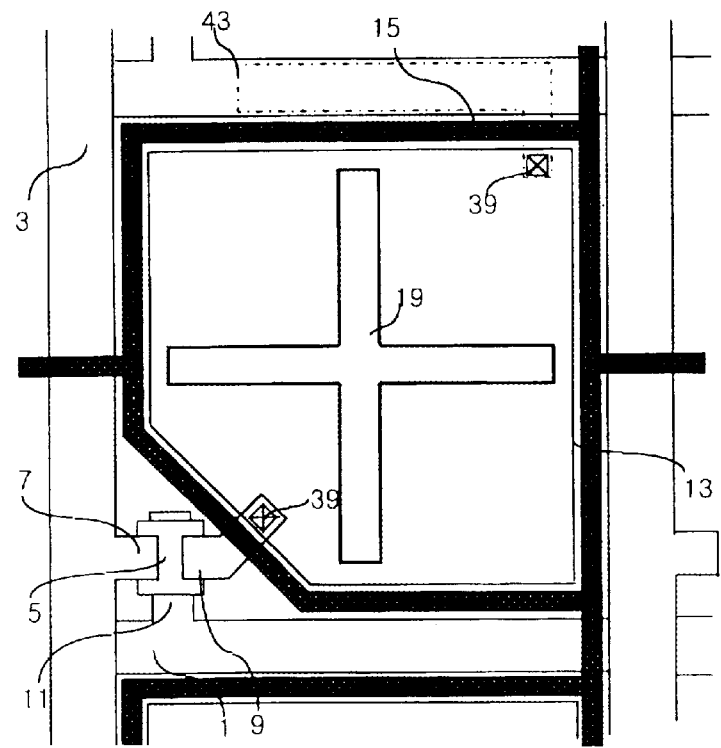
Figure 7C:
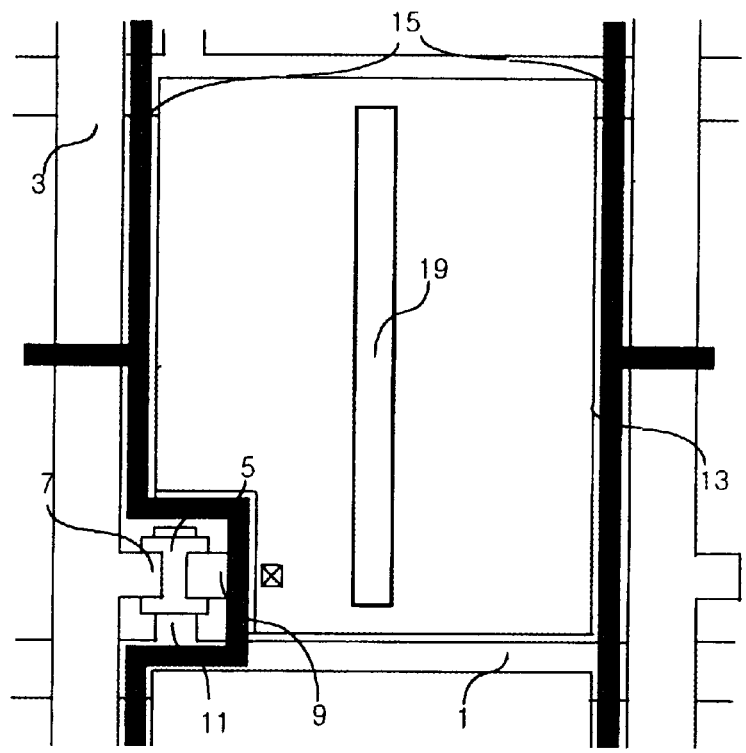
Figure 7D:
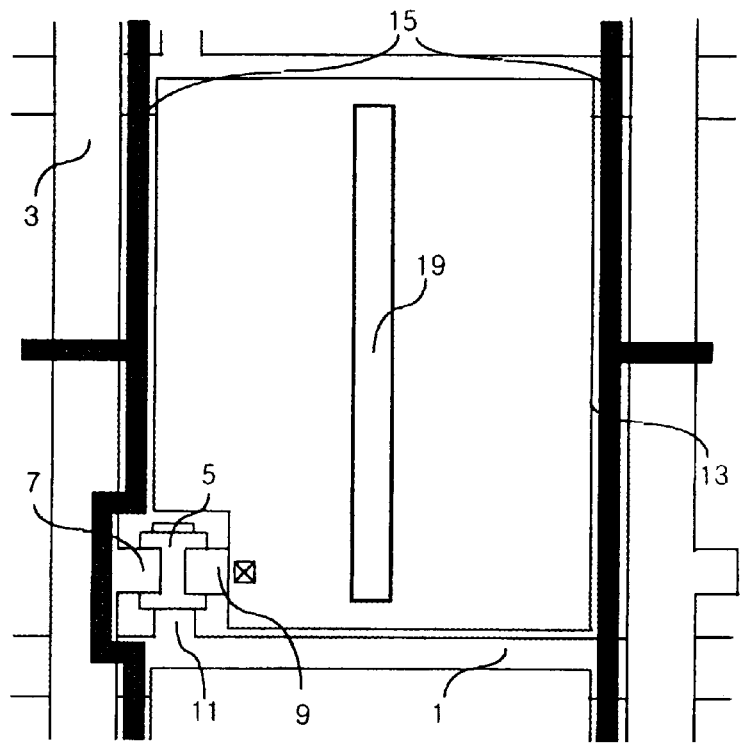
Figure 7E:
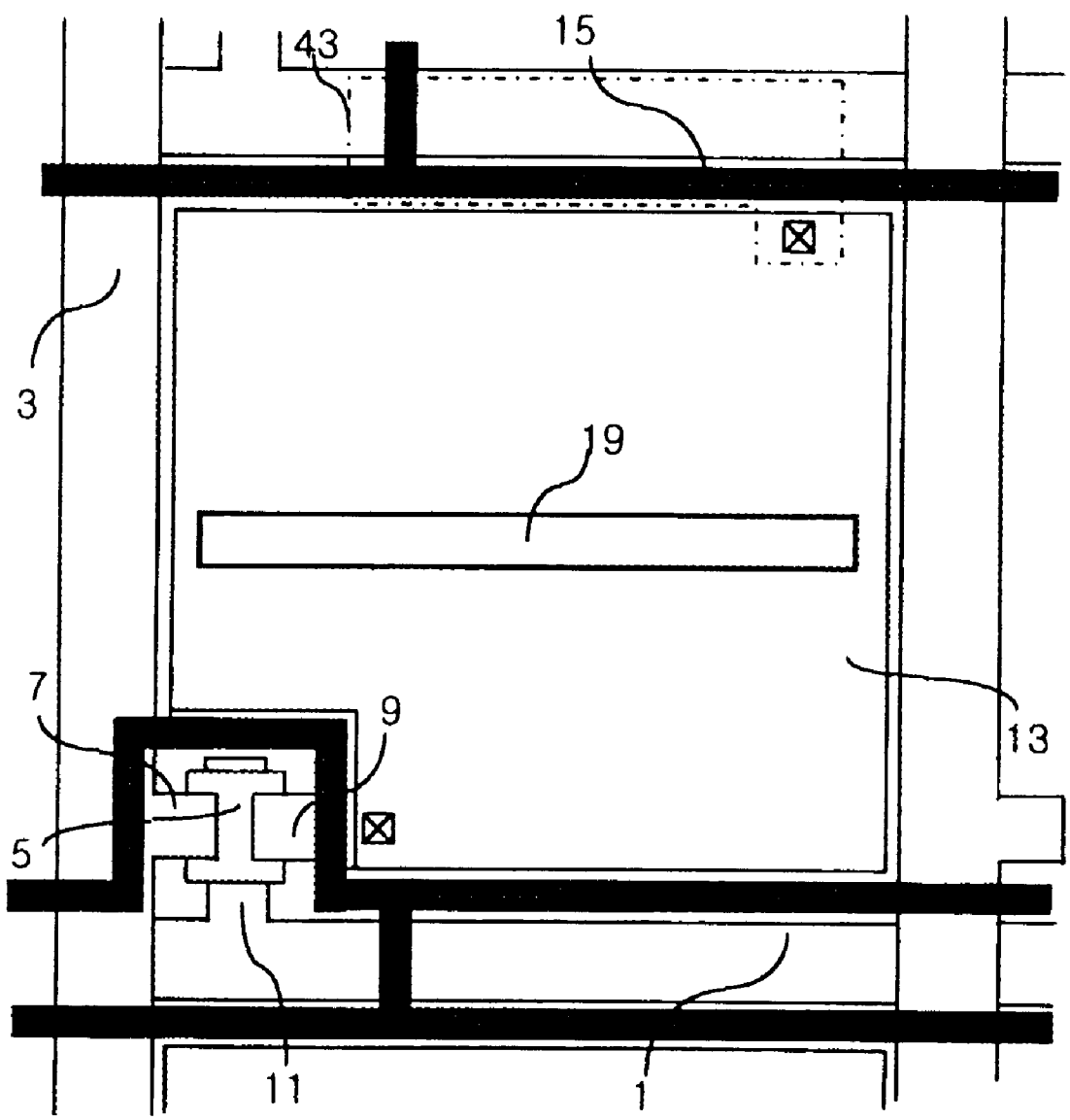

As alternative embodiments to FIGS. 7A and 7B, in the LCD of FIGS. 7C and 7D, the subsidiary electrode 15 is formed only at the side of the data bus line 3, while in the LCD of FIG. 7E, the subsidiary electrode 15 is formed only at the side of the gate bus line 1.

In the LCDs of FIGS. 8A to 8D, the passivation layer includes BCB (benzocyclobutene), acrylic resin, polyimide compound, and other suitable low dielectric compounds as an organic insulator. Hence, the subsidiary electrode 15 on the side of data bus line 3 may be formed on anywhere on the data bus line 3 to improve the aperture ratio. Moreover, since the subsidiary electrode 15 may be formed anywhere on the data bus line 3, the pixel region may become broader than the LCDs shown in the FIGS. 7A to 7D.

Figure 8A:
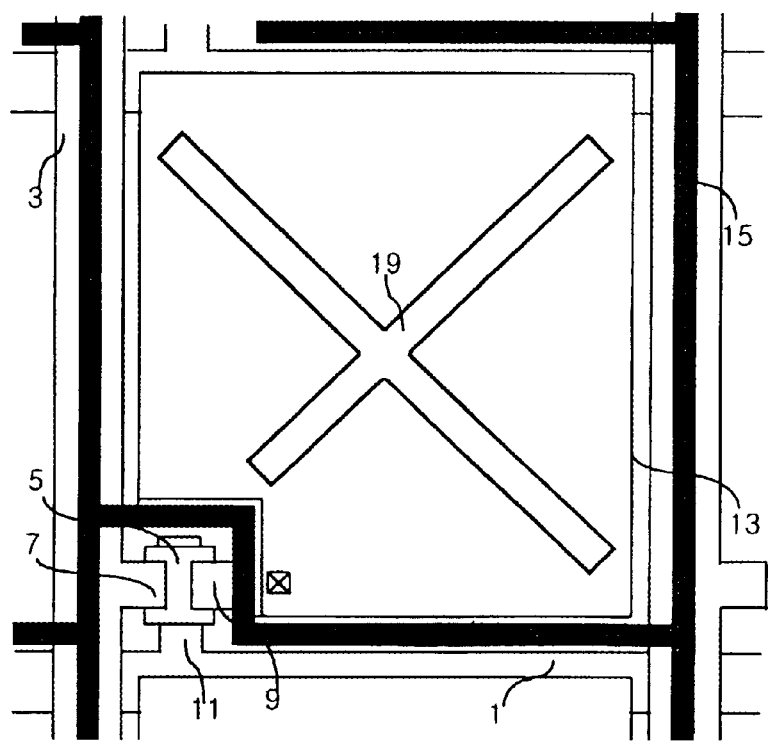
FIGS. 8A to 8D are plan views of the multi-domain liquid crystal display devices according to embodiments of the present invention.
Figure 8B:
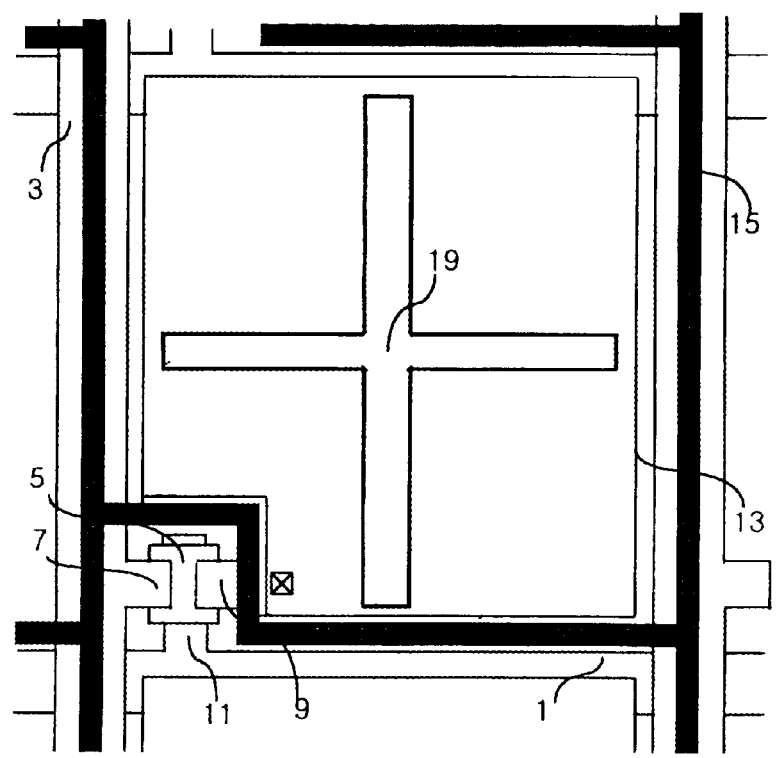
Figure 8C:
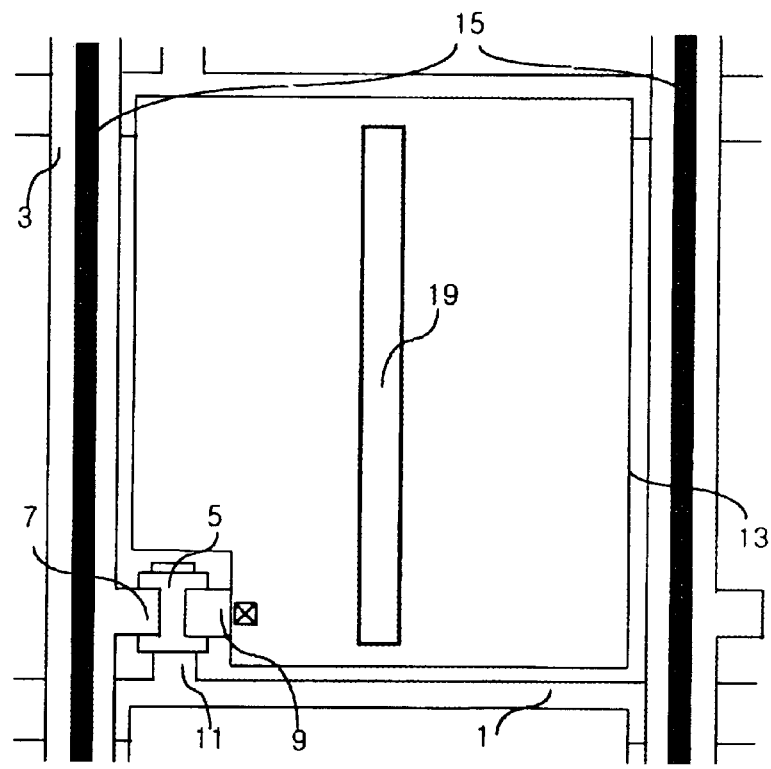
Figure 8D:
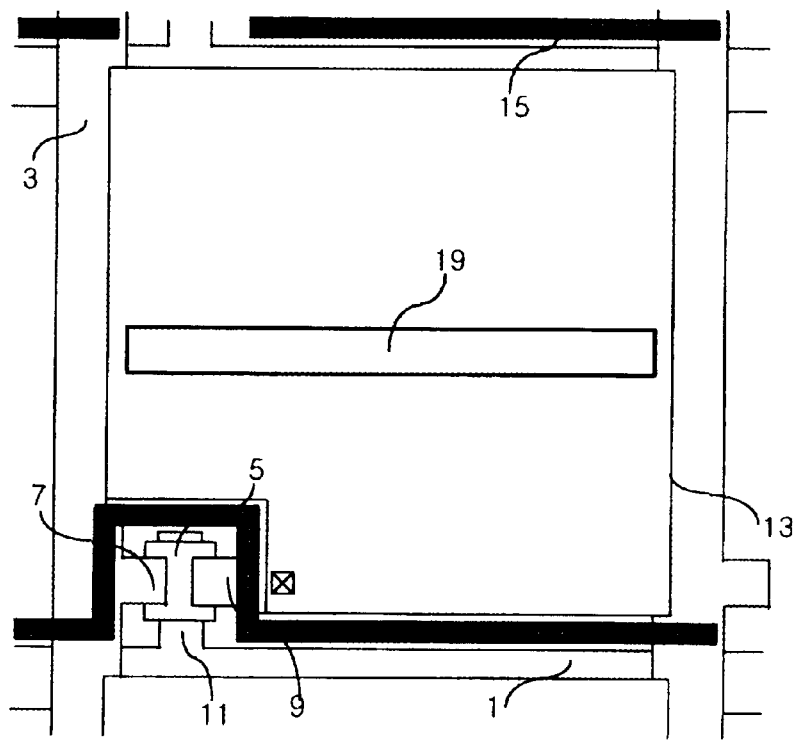
Figure 9A:
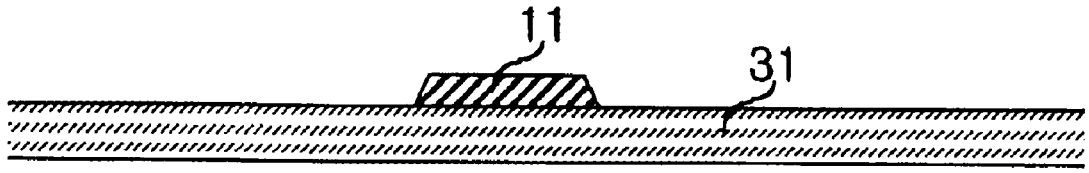
FIGS. 9A to 9F are sectional views showing the manufacturing process of the multi-domain liquid crystal display device according to the present invention.
Figure 9B:
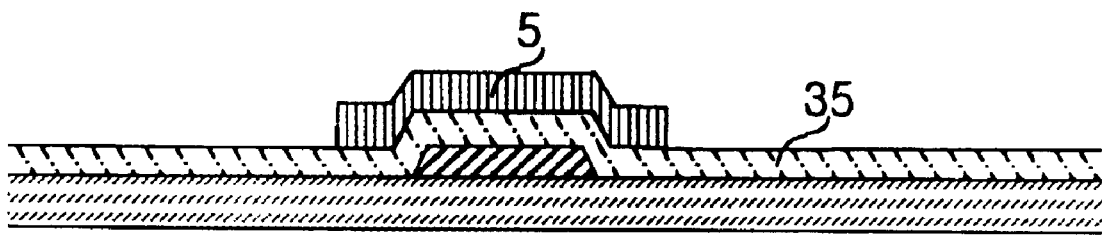
Figure 9C:
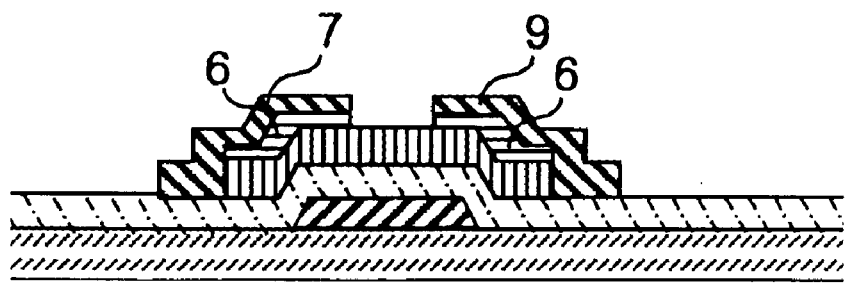
Figure 9D:
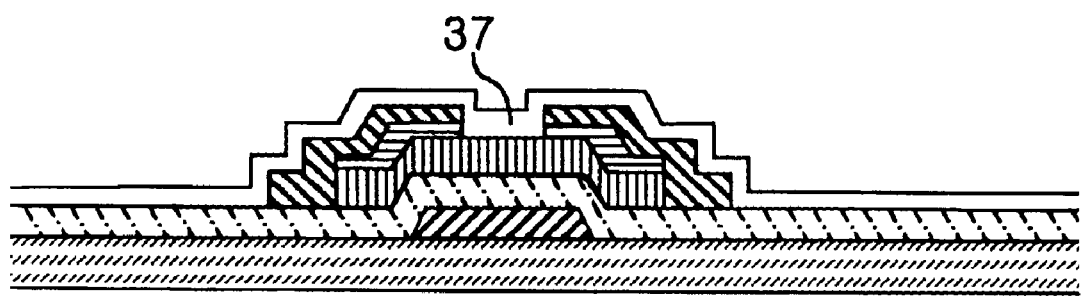
Figure 9E:
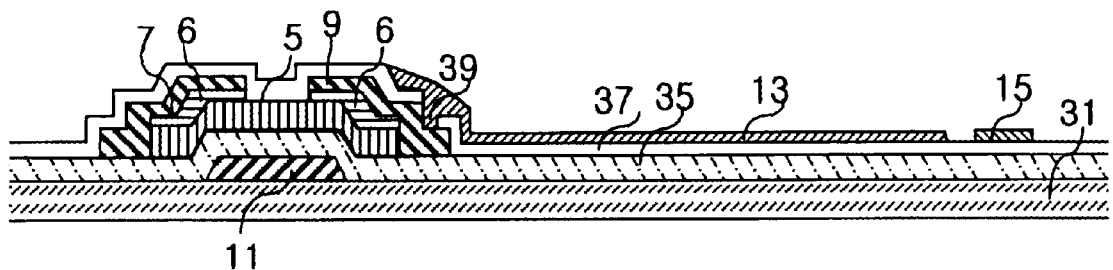
Figure 9F:
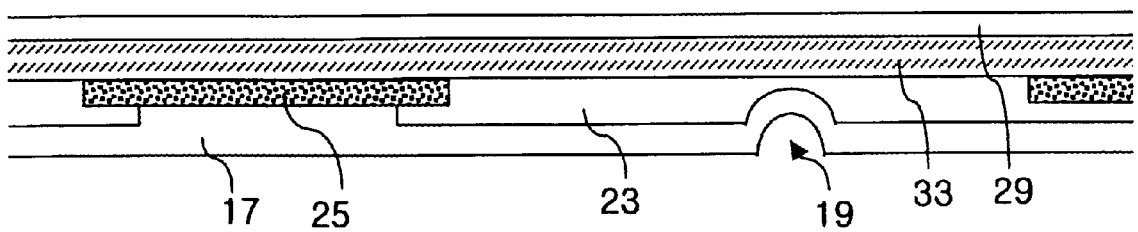
Figure 9F:
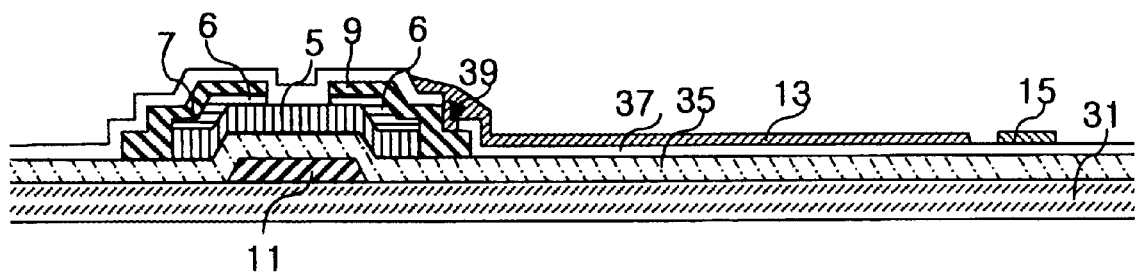

As alternative embodiments to FIGS. 8A and 8B, in the LCD of FIG. 8C, the subsidiary electrode 15 may be formed any place on the data bus line but only at the side of the data bus line 3, while in the LCD of FIG. 8D, the subsidiary electrode 15 may be formed any place on the gate bus line but only at the side of the gate bus line 1.

Furthermore, in the present LCD, an alignment layer(not shown in the figure) is formed over the whole first and/or second substrates. The alignment layer includes a material such as polyamide or polyimide based materials, PVA (polyvinylalcohol), polyamic acid or $SiO_2$. For rubbing treatments to determine an alignment direction, it is possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for photo-alignment may be used.

Irradiating light once on the alignment layer determines the alignment or pretilt direction and the pretilt angle. The light used in the photo-alignment is preferably light in a range of ultraviolet light, and any of non-polarized light, linearly polarized light, and partially polarized light can be used.

In the rubbing or photo-alignment treatment, it is possible to apply one or both of the first and second substrates, to apply different aligning-treatment on each substrate, or only to form the alignment layer without the alignment-treatment.

From the alignment-treatment, a multi-domain LCD is formed to have at least two domains. LC molecules of the LC layer are aligned differently from one another on each domain. That is, the multi-domain is obtained by dividing each pixel into four domains such as a "+" or "x" shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

It is possible to apply the LCD of the present invention to any alignment and mode including, for example, (1) a homogeneous alignment where liquid crystal molecules in the liquid crystal layer are aligned homogeneously to surfaces of the first and second substrates, (2) a homeotropic alignment where liquid crystal molecules in the liquid crystal layer are aligned homeotropically to surfaces of the first and second substrates, (3) a tilted alignment where liquid crystal molecules in the liquid crystal layer are aligned tiltedly to surfaces of the first and second substrates, (4) a twisted alignment where liquid crystal molecules in the liquid crystal layer are aligned twistedly to surfaces of the first and second substrates, and (5) a hybrid alignment where liquid crystal molecules in the liquid crystal layer are aligned homogeneously to surface of one substrate between the first and second substrates and are aligned homeotropically to surface of the other substrate.

Consequently, since the present LCD includes a color filter layer with electric field-distorting holes or recesses and the common electrode is formed along the surface of the color filter layer, electric field distortion is induced. Moreover, this process of the present invention is a simplified process which still maximizes the multi-domain effect to obtain a wide-viewing angle.

Figure 1A:
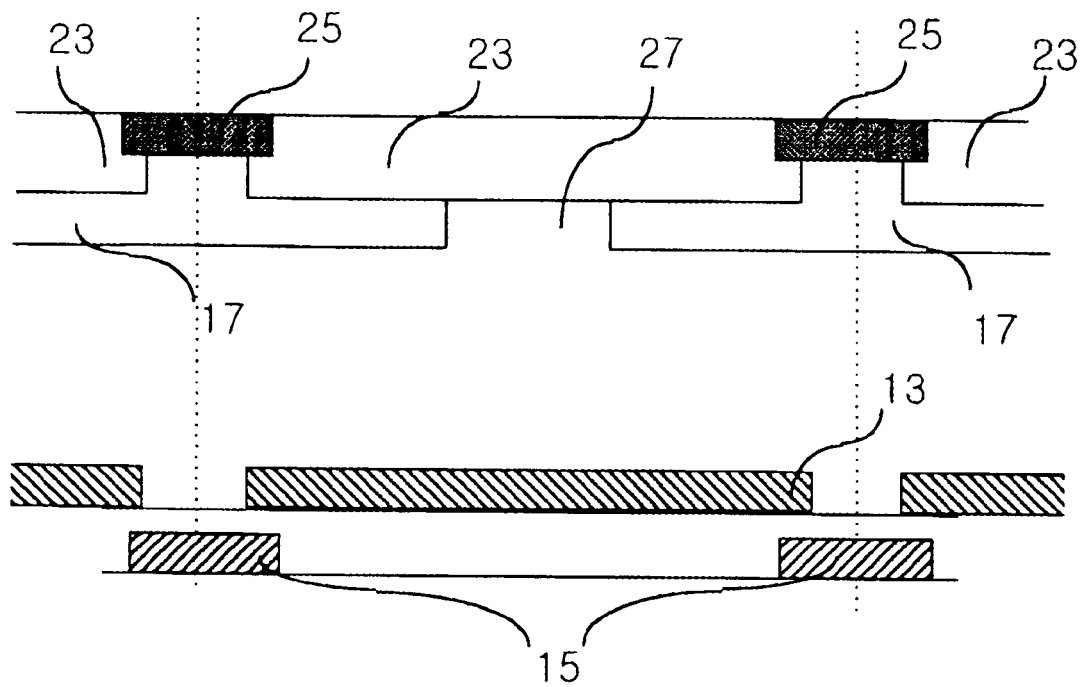
FIGS. 1A and 1B are sectional views of the conventional liquid crystal display devices.
Figure 1B:
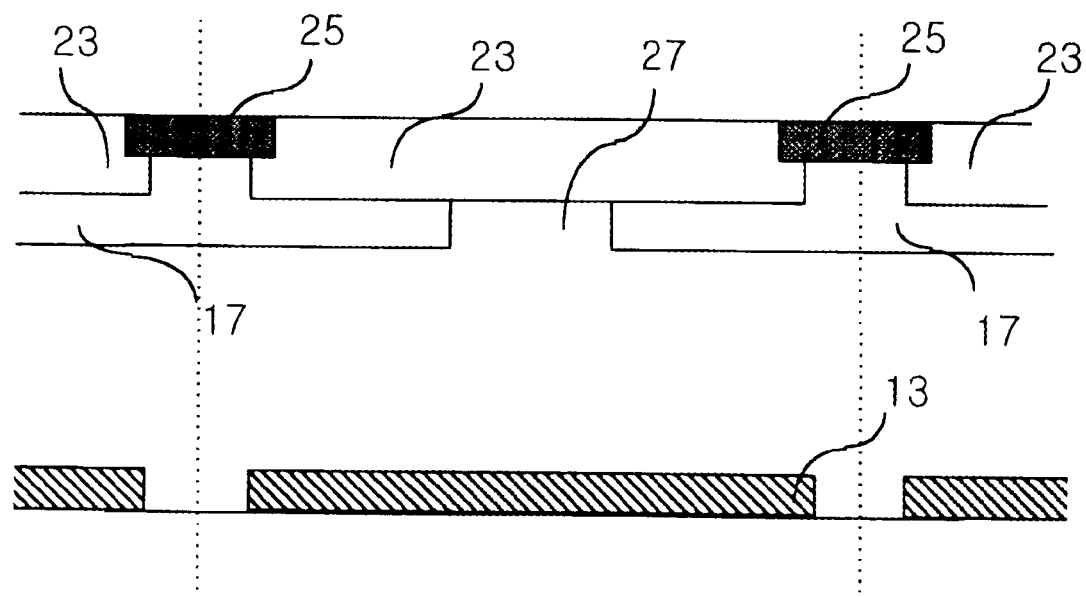
Figure 2A:
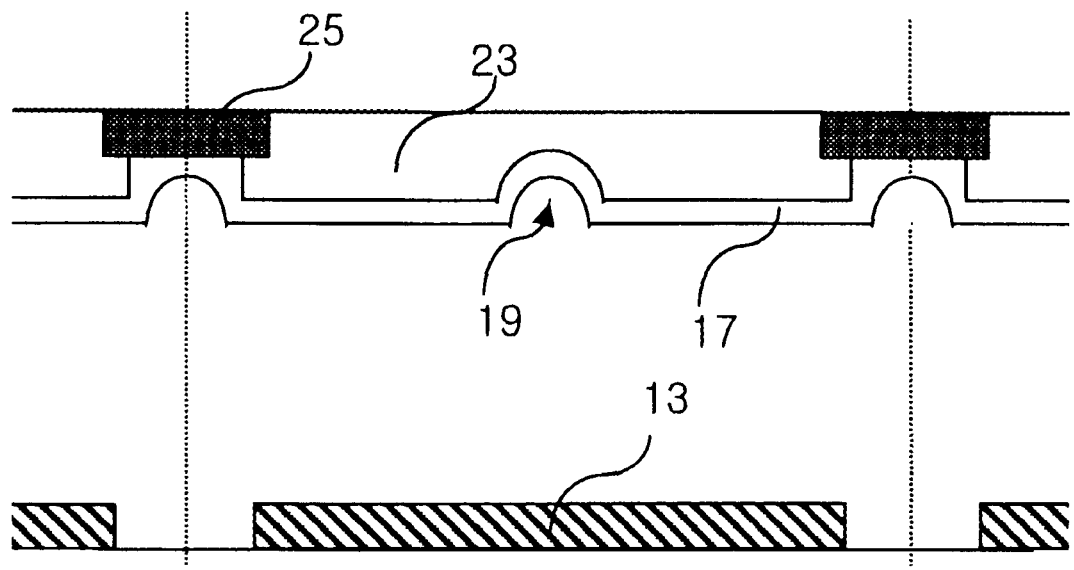
FIGS. 2A and 2B are sectional views of the multi-domain liquid crystal display device according to a first embodiment of the present invention.
Figure 2B:
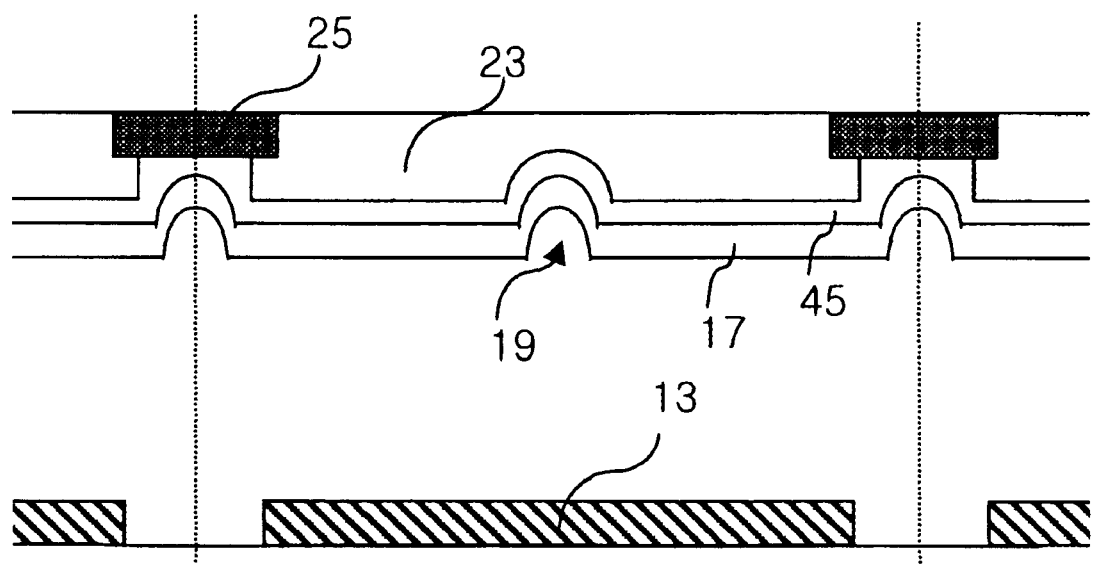

When conducting an alignment treatment, a rapid response time and a stable LC structure can be obtained by the formed pretilt and anchoring energy. Moreover, since the present invention forms a slit in the conventional mask and the electric field-distorting holes are formed by the slitted mask on the color filter layer, it is possible to omit the patterning process of the common electrode, such as shown in FIGS. 1A and 1B, for example.

It will be apparent to those skilled in the art that various modifications can be made in the multi-domain liquid crystal display device and method of manufacturing of the present invention without departing from the sprit or scope of the invention. Thus, it is intended that the present invention cover the modifications and variations of this invention provided they come within the scope of the appended claims and their equivalents.

What is claimed is:

1. A multi-domain liquid crystal display device comprising:
   first and second substrates facing each other;
   a liquid crystal layer between said first and second substrates;
   a plurality of gate bus lines arranged in a first direction on said first substrate and a plurality of data bus lines arranged in a second direction on said first substrate to define a pixel region;
   a thin film transistor positioned at a crossing area of said data bus line and said gate bus line, said thin film transistor comprising a gate electrode, a semiconductor layer, and source/drain electrodes;
   a pixel electrode in said pixel region;
   a light-shielding layer on said second substrate;
   a color filters on said light shielding layer, said color filter layer having first plurality of recesses;
   a common electrode on said color filter layer, said common electrode having second plurality of recesses corresponding to said first plurality of recesses of said color filters; and
   an alignment layer on at least one substrate between said first and second substrates.

2. The multi-domain liquid crystal display device according to claim 1, wherein said first plurality of recesses of said color filters distorts electric field.

3. The multi-domain liquid crystal display device according to claim 1, further comprising:
   a subsidiary electrode on a same layer as said pixel electrode.

4. The multi-domain liquid crystal display device according to claim 3, wherein said subsidiary electrode is in a region where said pixel electrode does not exist.

5. The multi-domain liquid crystal display device according to claim 3, wherein said subsidiary electrode is electrically connected to said common electrode.

6. The multi-domain liquid crystal display device according to claim 1, further comprising:
   a passivation layer insulating said pixel and subsidiary electrodes from electrodes and bus lines other than said pixel and subsidiary electrodes.

7. The multi-domain liquid crystal display device according to claim 6, wherein said passivation layer includes a material selected from the group consisting of BCB (BenzoCycloButene), acrylic resin, and polyimide compound.

8. The multi-domain liquid crystal display device according to claim 7, wherein said subsidiary electrode overlaps said data bus line.

9. The multi-domain liquid crystal display device according to claim 6, wherein said passivation layer includes a material selected from the group consisting of silicon nitride and silicon oxide.

10. The multi-domain liquid crystal display device according to claim 9, wherein said passivation layer insulates said subsidiary electrode from said pixel electrode.

11. The multi-domain liquid crystal display device according to claim 3, wherein said subsidiary electrode includes a material selected from the group consisting of ITO (indium tin oxide), aluminum, molybdenum, chromium, tantalum, titanium, and an alloy thereof.

12. The multi-domain liquid crystal display device according to claim 1, wherein said pixel electrode includes a material selected from the group consisting of ITO (indium tin oxide), aluminum, and chromium.

13. The multi-domain liquid crystal display device according to claim 1, wherein said common electrode includes ITO (indium tin oxide).

14. The multi-domain liquid crystal display device according to claim 1, wherein said pixel region is divided into at least two portions, liquid crystal molecules in said liquid crystal layer for each portion being driven differently from each other.

15. The multi-domain liquid crystal display device according to claim 1, wherein said alignment layer is divided into at least two portions, liquid crystal molecules in said liquid crystal layer for each portion being aligned differently from each other.

16. The multi-domain liquid crystal display device according to claim 15, wherein at least one portion of said at least two portions of said alignment layer is alignment-treated.

17. The multi-domain liquid crystal display device according to claim 15, wherein all portions of said at least two portions of said alignment layer are non-alignment-treated.

18. The multi-domain liquid crystal display device according to claim 15, wherein at least one portion of said at least two portions of said alignment layer is rubbing-treated.

19. The multi-domain liquid crystal display device according to claim 18, wherein said alignment layer includes a material selected from the group consisting of polyimide and polyamide based materials, PVA (polyvinylalcohol), polyamic acid, and silicon dioxide.

20. The multi-domain liquid crystal display device according to claim 15, wherein at least one portion of said at least two portions of said alignment layer is photo-alignment-treated.

21. The multi-domain liquid crystal display device according to claim 20, wherein said alignment layer includes a material selected from the group consisting of PVCN (polyvinylcinnamate), PSCN (polysiloxanecinnamate), and CelCN (cellulosecinnamate) based materials.

22. The multi-domain liquid crystal display device according to claim 20, wherein said alignment layer is photo-alignment-treated using light in range of ultraviolet light.

23. The multi-domain liquid crystal display device according to claim 20, wherein said alignment layer is photo-alignment-treated using light irradiation at least one time.

24. The multi-domain liquid crystal display device according to claim 1, wherein liquid crystal molecules in said liquid crystal layer are aligned homogeneously to surfaces of said first and second substrates.

25. The multi-domain liquid crystal display device according to claim 1, wherein liquid crystal molecules in said liquid crystal layer are aligned homeotropically to surfaces of said first and second substrates.

26. The multi-domain liquid crystal display device according to claim 1, wherein liquid crystal molecules in said liquid crystal layer are aligned tiltedly to surfaces of said first and second substrates.

27. The multi-domain liquid crystal display device according to claim 1, wherein liquid crystal molecules in said liquid crystal layer are aligned twistedly to surfaces of said first and second substrates.

28. The multi-domain liquid crystal display device according to claim 1, wherein liquid crystal molecules in said liquid crystal layer are aligned homogeneously to surface of one substrate between said first and second substrates and are aligned homeotropically to surface of the other substrate.

29. The multi-domain liquid crystal display device according to claim 1, wherein said liquid crystal layer includes liquid crystal molecules having positive dielectric anisotropy.

30. The multi-domain liquid crystal display device according to claim 1, wherein said liquid crystal layer includes liquid crystal molecules having negative dielectric anisotropy.

31. The multi-domain liquid crystal display device according to claim 1, further comprising:
   a negative uniaxial film between said first substrate and a polarizer, and/or between said second substrate and a polarizer.

32. The multi-domain liquid crystal display device according to claim 1, further comprising:
   a negative biaxial film between said first substrate and a polarizer, and/or between said second substrate and a polarizer.

33. The multi-domain liquid crystal display device according to claim 1, wherein said liquid crystal layer includes chiral dopants.

34. The multi-domain liquid crystal display device according to claim 1, further comprising:
   a polarizer on at least one substrate between said first and second substrates.

35. A multi-domain liquid crystal display device comprising:
   a substrate;
   a plurality of light shielding layers on said substrate;
   a color filters with a plurality of electric field-distorting recesses on said light shielding layer; and
   a common electrode on said color filter layer, said common electrode having recesses corresponding to said electric field-distorting recesses of said color filter layer.

36. The multi-domain liquid crystal display device according to claim 35, wherein said electric field-distorting recesses of said color filter layer include holes in said color filters.

37. A multi-domain liquid crystal display device comprising:
   first and second substrates facing each other;
   a liquid crystal layer between said first and second substrates;
   a plurality of gate bus lines arranged in a first direction on said first substrate and a plurality of data bus lines arranged in a second direction on said first substrate to define a pixel region;
   a thin film transistor positioned at a crossing area of said data bus line and said gate bus line, said thin film transistor comprising a gate electrode, a semiconductor layer, and source/drain electrodes;
   a pixel electrode in said pixel region;
   a light-shielding layer on said second substrate;
   a color filters on said light shielding layer, said color filter layer having a plurality of holes exposing portions of said second substrate;
   a common electrode on said color filter layer, said common electrode having a plurality of recesses corresponding to said plurality of holes of said color filters; and
   an alignment layer on at least one substrate between said first and second substrates.

38. A method of manufacturing a multi-domain liquid crystal display device comprising the steps of:

forming a plurality of light shielding layers on a substrate;

forming a color filters with a plurality of electric field-distorting recesses on said light shielding layer; and forming a common electrode on said color filter layer, said common electrode having recesses corresponding to said electric field-distorting recesses of said color filter layer.

39. The method of manufacturing a multi-domain liquid crystal display device according to claim 38, wherein said step of forming a color filters includes dyeing using a dyestuff.

40. The method of manufacturing a multi-domain liquid crystal display device according to claim 38, wherein said step of forming a color filters includes dispersing one of a dyestuff and a pigment.

41. The method of manufacturing a multi-domain liquid crystal display device according to claim 38, wherein said step of forming a color filters comprises the steps of:

depositing a photosensitive layer;

irradiating light onto said photosensitive layer through a mask with a slit; and developing said photosensitive layer.

42. The method of manufacturing a multi-domain liquid crystal display device according to claim 38, further comprising:

forming an alignment layer on said substrate.

43. A method of manufacturing a multi-domain liquid crystal display device comprising the steps of:

forming first and second substrates facing each other;

forming a liquid crystal layer between said first and second substrates;

forming a plurality of gate bus lines arranged in a first direction on said first substrate and a plurality of data bus lines arranged in a second direction on said first substrate to define a pixel region;

forming a thin film transistor positioned at a crossing area of said data bus line and said gate bus line, said thin film transistor comprising a gate electrode, a semiconductor layer, and source/drain electrodes;

forming a pixel electrode in said pixel region;

forming a light shielding layer on said second substrate;

forming a color filter layer on said light shielding layer, said color filter layer having first plurality of recesses;

forming a common electrode on said color filter layer, said common electrode having second plurality of recesses corresponding to said first plurality of recesses of said color filter layer; and forming an alignment layer on at least one substrate between said first and second substrates.

44. A method of manufacturing a multi-domain liquid crystal display device comprising the steps of:

forming first and second substrates facing each other;

forming a liquid crystal layer between said first and second substrates;

forming a plurality of gate bus lines arranged in a first direction on said first substrate and a plurality of data bus lines arranged in a second direction on said first substrate to define a pixel region;

forming a thin film transistor positioned at a crossing area of said data bus line and said gate bus line, said thin film transistor comprising a gate electrode, a semiconductor layer, and source/drain electrodes;

forming a pixel electrode in said pixel region;

forming a light shielding layer on said second substrate;

forming a color filters on said light shielding layer, said color filters having a plurality of holes exposing portions of said second substrate;

forming a common electrode on said color filter layer, said common electrode having a plurality of recesses corresponding to said plurality of holes of said color filters; and forming an alignment layer on at least one substrate between said first and second substrates.

* * * * *